United States Patent [19]

Phillips

[11] 4,024,120

[45] May 17, 1977

[54] PROCESS FOR PRODUCING BLAND, PROTEIN ENRICHED PRODUCTS FROM GRAIN GLUTEN

[75] Inventor: Robert Dixon Phillips, Elkhart, Ind.

[73] Assignee: Miles Laboratories, Inc., Elkhart, Ind.

[22] Filed: Aug. 4, 1975

[21] Appl. No.: 601,470

[52] U.S. Cl. .......................................... 260/112 G
[51] Int. Cl.² .......................................... A23J 1/12
[58] Field of Search .................. 260/112 G, 412.4

[56] References Cited

UNITED STATES PATENTS

| | | | |
|---|---|---|---|
| 2,388,389 | 11/1945 | Coleman | 260/123 |
| 2,567,980 | 9/1951 | Tuomy | 260/112 G |
| 2,676,169 | 4/1954 | Baldoni | 260/112 G |
| 3,408,374 | 10/1968 | Cavanagh | 260/412.4 |
| 3,770,452 | 11/1973 | Finley | 260/112 G |
| 3,840,515 | 10/1974 | Reiners | 260/112 G |
| 3,880,824 | 4/1975 | Rao | 260/112 G |

*Primary Examiner*—Paul R. Michl
*Attorney, Agent, or Firm*—R. W. Winchell

[57] ABSTRACT

A bland, protein enriched product is produced by contacting crude grain gluten with a solvent containing about 70 to 100 percent ethyl acetate, 0 to 15 percent aliphatic alcohol having 1 to 4 carbon atoms, and 0 to 30 percent water, wherein the percentages are by weight based upon the total weight of solvent, separating the gluten from the solvent, washing the separated gluten with water, separating the washed gluten from the water and drying the washed gluten product.

7 Claims, No Drawings

PROCESS FOR PRODUCING BLAND, PROTEIN ENRICHED PRODUCTS FROM GRAIN GLUTEN

BACKGROUND AND PRIOR ART

For years food scientists have had a continuing interest in producing palatable, nutritious proteinaceous food products from plant sources as a supplement to or as a replacement for animal protein foods. The proteinaceous products must be economical, nutritionally well balanced and aesthetically acceptable to the human consumer, i.e. the product must be bland in flavor and odor and must be free of objectionable colors. At the present time, such proteinaceous food products are principally prepared from soybeans. Unfortunately, the soy proteins are relatively deficient in some essential sulfur bearing amino acids.

It is well known that many of the inherent disadvantages of soybeans can be overcome by combining the soy protein with proteins from another source. For example, the protein from cereal grains has a good amino acid balance and high biological value. Thus, because of their low cost and nutritional value, the crude grain glutens from such cereals as corn, sorghum, wheat and the like have been frequently suggested as having potential use, in combination with soy protein, in food products. In particular, it has been suggested to use corn gluten. Major obstacles, however, to the general use of crude grain gluten have been the characteristic bad flavors and odors, intense colors, oils, and high moisture contents of these potential sources.

Considerable efforts have been made in the past to prepare protein products from grain gluten using classical methods, but such efforts have been only moderately successful. These efforts have not allowed the valuable protein to be recovered in commercial quantities at low cost or completely free of the gluten's characteristic flavors, odors, colors, carbohydrates or salts.

Generally, the classical methods of extraction using linear hydrocarbon solvents have not been satisfactory due to the immiscibility of the solvents with the high amounts of water usually present in the grain gluten. Hydrophilic solvents, such as the lower aliphatic alcohols, have also been used for deoiling oilseeds, but they cannot be used successfully with aqueous wet gluten without serious loss of the alcohol soluble protein fraction. Other solvents, as disclosed in Canadian Pat. No. 378,122, such as ethyl acetate, acetone, benzene, petroleum fractions, ether and the like have been used under moderate temperatures and high pressure conditions to retain enzyme activity and extract oils from dry beans and seeds, but the resulting product is substantially unchanged other than the decrease in oil content. Solvent mixtures, as disclosed in U.S. Pat. No. 3,408,374, such as ethanol-ethyl acetate-acetone (1:1:1) and ethanol-ethyl acetate-isopropyl ether (4:2:1) have likewise been used to extract aqueous wet, oil-bearing vegetable materials, but residual water soluble components still remain in the solvent extracted raw material. In each case, the prior art techniques are costly and the products which result are not completely satisfactory.

SUMMARY OF THE INVENTION

It is therefore highly desirable to employ a simple efficient process for the removal of characteristic oils, flavors, odors, colors, carbohydrates and the like from commercial quantities of crude grain gluten without the disadvantages of the prior art processes described above.

In accordance with the present invention, a novel process is provided for the preparation of a bland, protein enriched product by contacting crude grain gluten with a solvent containing about 70 to 100 percent ethyl acetate, 0 to 15 percent aliphatic alcohol having 1 to 4 carbon atoms, and 0 to 30 percent water, wherein the percentages are by weight based upon the total weight of solvent, separating the gluten from the solvent, washing the separated gluten with water, separating the washed gluten from the water and drying the resulting product.

DESCRIPTION OF THE INVENTION

For starting materials in this process, there can be used any crude grain gluten derived from well known sources including principally corn, sorghum and wheat. Usually the grain gluten is a by-product of the grain processing and contains the proteinaceous residue of the endosperm and germ, off-flavors, carbohydrates, fiberous cell components, grain hulls, oils and residual steepwater from the grain processing. At present, the spent gluten portion of grains, like that from corn and sorghum, is unfit for human consumption and is marketed as a source of animal feed only. Due to its availability, low cost and nutritionally good protein, corn gluten obtained as a by-product from the saccharification of the starch in corn flour is the gluten preferred for use as the starting material in the present process. A typical analysis of such crude corn gluten may be 50 to 70 percent moisture and on a dry basis 50 to 55 percent protein, 15 to 20 percent oil, about 25 percent carbohydrate, 3.5 percent fiber and 1 to 2 percent ash. For the purposes of this invention, it is preferable to use the aqueous wet grain gluten which directly results as a by-product of the grain processing. However, dried grain gluten which has been rehydrated can also be used as the starting material.

The solvents or solvent mixtures useful in this process contain about 70 to 100 percent ethyl acetate, 0 to 15 percent aliphatic alcohol having 1 to 4 carbon atoms, and 0 to 30 percent water, wherein the percentages are by weight based upon the total weight of solvent. Illustrative alcohols employed herein include aliphatic monohydric alcohols of from 1 to 4 carbon atoms, such as ethanol, isopropanol, butanol, mixtures thereof and the like. It is preferred to use ethyl acetate alone or it's azeotropes with the above alcohol and/or water. In this type of commercial process, the use of a single solvent or an azeotrope which is reconstituted upon recycling provides a significant advantage in the efficient and economic practice of the invention. Specific examples of useful solvents, other than ethyl acetate alone, include aqueous saturated ethyl acetate, the binary azeotrope of ethyl acetate and water and the ternary azeotrope of ethyl acetate, ethanol and water. The binary azeotrope contains at atmospheric pressure about 93.9 percent ethyl acetate and 6.1 percent water on a weight/weight basis and has a boiling point of 70.4° C. The ternary azeotrope contains at atmospheric pressure about 83.2 percent ethyl acetate, 9.0 percent ethanol and 7.8 percent water on a weight/weight basis and has a boiling point of 70.2° C.

In practicing this invention, an aqueous wet crude grain gluten is first contacted with one of the organic solvents mentioned above to extract therefrom such impurities as oils, undesirable flavors, odors or colors and some carbohydrates into the solvent. The gluten solids are separated from the solvent by such convenient means as filtration, centrifugation and the like. The separated gluten solids are then washed with water to remove such impurities as residual flavors, odors or color, salts, water soluble carbohydrates and residual solvent. The washed gluten solids are separated from the wash water in a similar manner as described above and then dried. The dried product is bland in flavor and odor, off-white to pale tan in color and usually contains about 70 percent protein, less than 0.5 percent oil and about 20 percent insoluble carbohydrates. The spent solvent can be easily recovered by such suitable means as distillation and recycled for reuse in the process.

It will be appreciated by those skilled in the art that the above process can be practiced as a batch or continuous process and that the concentrations of materials, temperature and contact time will vary widely depending upon the type of process or equipment selected. Thus, for example, in a batch process, a concentration ratio of about 8 to 12 parts of organic solvent to one part of gluten solids on a dry basis has been used successfully. In a continuous process, such as in a countercurrent multistage extractor or liquid cyclone, it is possible to reduce the ratio of solvent to gluten solids and still achieve good extraction efficiency.

The temperature for solvent contact will likewise vary over a broad range from about room temperature to the boiling point of the solvent. In general, however, the efficiency of the extraction improves as the temperature increases. Good extractions have been achieved at a temperature between about 50° C. and 72° C. Preferably, the temperature will be close to the boiling point of the solvent, i.e. from about 70° C. to 72° C.

The contact time is principally a function of the equipment used. However, in batch operations, contact times as low as one-half hour have been used successfully. Continuous process extractors will allow this time to be reduced even further. In either the batch or continuous process, contact times in each stage can obviously be reduced by increasing the number of contact stages.

After the gluten solids have been solvent contacted, they are separated by convenient means from the solvent and washed with water. The water washing can be accomplished using similar batch or continuous process conditions as described above. Preferably, the water washing should be carried out at a temperature above about 60° C. to improve the extraction of particularly troublesome impurities such as flavors, odors, color and water soluble carbohydrates. In addition to removing residual impurities at these temperatures, the organic solvent can be easily recovered simultaneously as the distilled azeotrope and recycled.

The washed gluten solids are then dried using such convenient means as spray drying, drum drying, freeze drying, vacuum drying and the like. Preferably the drying should be accomplished under mild temperature condition such that the protein will not be damaged.

In addition to bland flavor and odor, pale color and enriched protein content, the instant protein products from grain gluten are desirably rich in such sulfur bearing amino acids as methionine and cystine. As a result, the products of this invention can be combined with protein products from other vegetable sources, such as soybeans, which are deficient in sulfur amino acids, to produce nutritionally superior products. Such combinations are extremely useful in the preparation of textured vegetable protein products, meat analogs and the like.

The following examples are illustrative of the invention and are not intended to limit the scope thereof.

EXAMPLE 1

This example illustrates the preparation of a bland, protein enriched product from crude corn gluten using ethyl acetate as the organic solvent in a batch process. The corn gluten used in this example was derived as a by-product of a commercial process for saccharification of the starch in corn flour. Physically, the corn gluten was intensely yellow in color and had an undesirable "corny" flavor and odor and a bitter taste.

About 100 pounds of aqueous wet corn gluten (about 70% $H_2O$) and 35 gallons of water-saturated commercial ethyl acetate (less than 4% $H_2O$) were charged into a 50 gallon jacketed vessel fitted with reflux condenser and stirrer. Under stirring conditions, the contents were heated to about 60° C. and maintained at this temperature for about 1.5 hours. The contents were cooled to about 40° C., discharged and centrifuged to separate the corn gluten solids from the solvent. Repeating this process, the separated solids were contacted again with fresh solvent and separated by centrifugation. The separated solids and 35 gallons of water at 70° C. were then charged into an open jacketed vessel and agitated for one hour. At the end of this time, the contents were discharged and centrifuged to separate the washed gluten solids from the wash water. The resulting solids were dried in a vacuum oven at 50° C.

Three batches of corn gluten product were prepared by this method and combined. The product was analyzed and found to have the chemical and physical properties shown in the following Table I.

Table 1

| | |
|---|---|
| Protein | 67% dry solids basis |
| Carbohydrates | 23.6% dry solids basis |
| Oil | 0.2% dry solids basis |
| Moisture | 3.5% |
| Color | Off white to light tan |
| Odor | None |

EXAMPLE 2

This example illustrates the preparation of the desired protein product from the corn gluten described in Example 1 using the ternary azeotrope of ethyl acetate, ethanol and water containing, on a weight/weight basis, 83.2% ethyl acetate, 9.0% ethanol and 7.8% water.

About 100 pounds of aqueous wet corn gluten (about 70% $H_2O$) and 35 gallons of the ternary azeotrope were charged into a 50 gallon jacketed vessel fitted with reflux condenser and stirrer. Under stirring conditions, the contents were heated to about 70° C. and maintained at this temperature for 2 hours. The contents were cooled to about 50° C., discharged and centrifuged to separate the corn gluten solids from the solvent. The separated solids were contacted a second time with fresh solvent and separated by centrifugation. The separated solids and 35 gallons of 70° C. water were then charged into an open jacketed vessel and agitated for one hour. At the end of this time, the contents were discharged and centrifuged to separate the washed gluten solids from the wash water. The resulting solids were dried in a forced air oven at 50° to 55° C.

Several batches of corn gluten product were produced by this method and combined. The product was analyzed and found to have the chemical and physical properties shown in Table II.

Table II

| Protein | 71% dry solids basis |
| --- | --- |
| Carbohydrates | 18% dry solids basis |
| Oil | 0.4% dry solids basis |
| Color | Off white to light tan |
| Flavor | Bland |
| Odor | None |

What is claimed is:

1. A process for the preparation of a bland, protein enriched product, which comprises:
   a. contacting crude grain gluten with a solvent containing about 70 to 100 percent ethyl acetate, 0 to 15 percent aliphatic alcohol having 1 to 4 carbon atoms, and 0 to 30 percent water, wherein the percentages are by weight based upon the total weight of solvent;
   b. separating the gluten from the solvent;
   c. washing the separated gluten with water;
   d. separating the washed gluten from the water; and
   e. drying the washed gluten product.

2. A process according to claim 1, wherein the grain gluten is corn gluten.

3. A process according to claim 1, wherein the temperature of the solvent and the grain gluten when in contact is between about 50° C. and 72° C.

4. A process according to claim 1, wherein the temperature at which the separated gluten is washed with water is greater than about 60° C.

5. A process according to claim 1, wherein the solvent is ethyl acetate.

6. A process according to claim 1 wherein the solvent is a binary azeotrope containing about 93.9 percent ethyl acetate and 6.1 percent water on a weight/weight basis.

7. A process according to claim 1 wherein the solvent is a ternary azeotrope containing about 83.2 percent ethyl acetate, 9.0 percent ethanol and 7.8 percent water on a weight/weight basis.

* * * * *